(12) United States Patent
Baker et al.

(10) Patent No.: US 7,997,189 B1
(45) Date of Patent: Aug. 16, 2011

(54) HEATED COMPRESSED AIR BROILER SYSTEM

(75) Inventors: Matthew J. Baker, Windsor, CA (US); Patrick D. Baker, Windsor, CA (US); Mohsen Sarfehjoo, Franklin, TN (US)

(73) Assignee: Nieco Corporation, Windsor, CA (US)

( * ) Notice: Subject to any disclaimer, the term of this patent is extended or adjusted under 35 U.S.C. 154(b) by 531 days.

(21) Appl. No.: 11/849,854

(22) Filed: Sep. 4, 2007

Related U.S. Application Data

(60) Provisional application No. 60/824,419, filed on Sep. 1, 2006.

(51) Int. Cl.
*F24C 15/32* (2006.01)
*F23D 14/12* (2006.01)
*A47J 37/00* (2006.01)

(52) U.S. Cl. .......... 99/386; 99/467; 126/21 A; 126/41 R

(58) Field of Classification Search .............. 99/425, 99/467, 476, 483; 219/388, 400, 405, 411; 126/39 R, 41 R, 39 E, 21 A; A47J 36/00, A47J 37/00; F27D 11/00
See application file for complete search history.

(56) References Cited

U.S. PATENT DOCUMENTS

| | | | |
|---|---|---|---|
| 2,767,668 A * | 10/1956 | Spooner | 426/496 |
| 3,289,731 A * | 12/1966 | Geber | 126/39 R |
| 3,832,990 A * | 9/1974 | Trosch | 126/41 R |
| 3,987,718 A | 10/1976 | Lang-Ree | |
| 4,121,509 A | 10/1978 | Baker | |
| 4,154,861 A * | 5/1979 | Smith | 219/388 |
| 4,188,868 A * | 2/1980 | Baker et al. | 99/386 |
| 4,416,249 A * | 11/1983 | Reynolds et al. | 126/41 R |
| 4,715,356 A * | 12/1987 | Reynolds | 126/39 H |
| 4,773,383 A * | 9/1988 | Le Monnier de Gouville et al. | 126/39 R |
| 4,881,519 A * | 11/1989 | Henke | 126/21 A |
| 4,899,724 A * | 2/1990 | Kuechler | 126/41 R |
| 4,936,286 A | 6/1990 | Baker | |
| 4,951,648 A * | 8/1990 | Shukla et al. | 126/21 A |
| 5,239,917 A * | 8/1993 | Lutkie et al. | 99/443 C |
| 5,468,145 A * | 11/1995 | Ferlin | 431/266 |
| 5,676,870 A * | 10/1997 | Wassman et al. | 126/21 A |
| 5,906,485 A * | 5/1999 | Groff et al. | 432/121 |
| 5,919,039 A * | 7/1999 | Shaw et al. | 432/121 |
| 5,942,142 A * | 8/1999 | Forney et al. | 126/21 A |
| 6,015,101 A * | 1/2000 | Williamson et al. | 239/455 |
| 6,371,011 B1 * | 4/2002 | Kuechler | 99/425 |
| 7,193,184 B1 * | 3/2007 | Manning | 219/388 |
| 2003/0056658 A1 * | 3/2003 | Jones et al. | 99/386 |
| 2009/0139976 A1 * | 6/2009 | Lee | 219/400 |

* cited by examiner

*Primary Examiner* — Geoffrey S Evans
(74) *Attorney, Agent, or Firm* — Craig M. Stainbrook; Stainbrook & Stainbrook, LLP

(57) ABSTRACT

An oven and broiler for cooking foods using convection and radiant heat, including a housing defining a cooking chamber with an inlet for introducing uncooked foods into the cooking chamber, an outlet for discharging cooked foods and a conveyor for conveying food product from the inlet to the outlet, an array of heating elements, and a compressed air injection system for providing a bank of moving air over the food product during the early stages of cooking so as to break up the blanket of cold air over the food product.

2 Claims, 4 Drawing Sheets

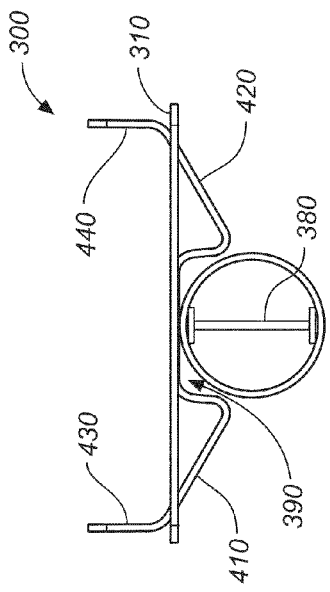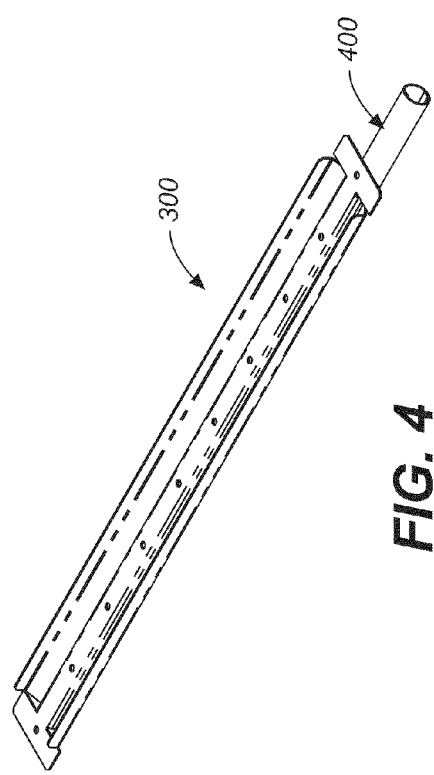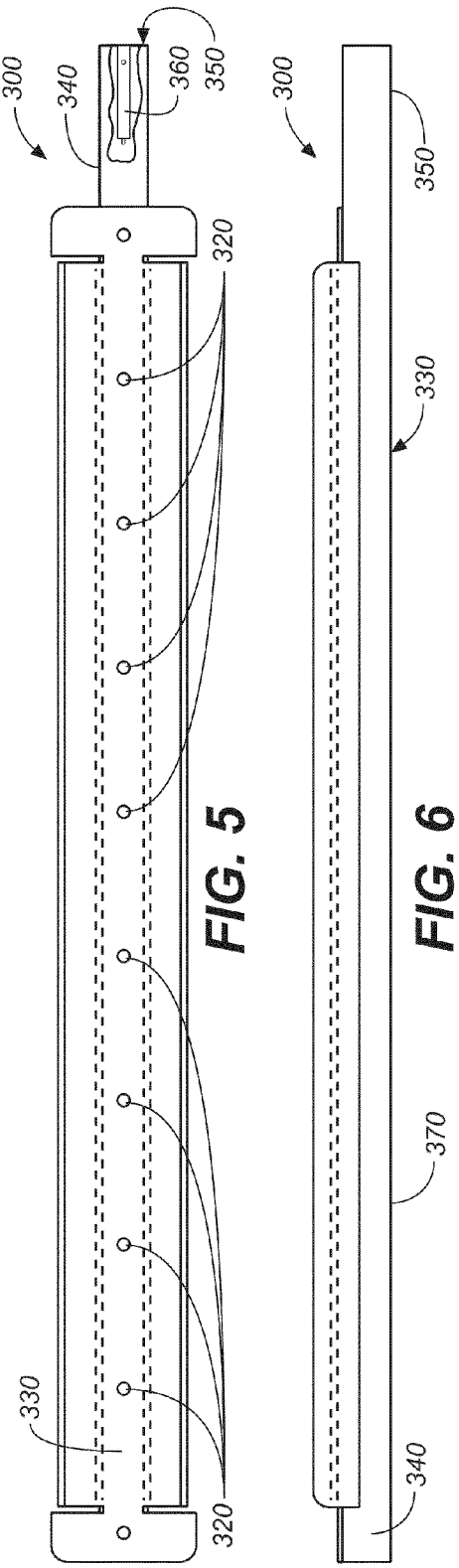

HEATED COMPRESSED AIR BROILER SYSTEM

CROSS REFERENCES TO RELATED APPLICATIONS

The present application claims the benefit of U.S. Provisional Patent Application Ser. No. 60/824,419, filed Sep. 1, 2006.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to broiler systems for the rapid cooking of food products, and more particularly to a broiler system combining different kinds of heating methods and including a novel gas burner design and the introduction of heated compressed air into the first stage of cooking. The system is adapted for cooking a variety of food products through the combination of radiant and convection heat.

2. Discussion of Related Art Including Information Disclosed Under 37 CFR §§1.97, 1.98

To prepare certain foods, such as hamburger patties, sausages, hot dogs, and chicken and fish fillets, and the like, as well as their respective buns, high output commercial food purveyors (i.e., fast food restaurants) utilize broiler systems that rapidly and continually cook the food products. The systems typically comprise a housing having a horizontal conveyor for moving food product from an input end to an output end. During the cooking process the food passes between a number of spaced-apart cooking elements, typically either electric resistance elements or gas burners. As may be readily appreciated, the profitability of utilizing such a system hinges on a number of factors, including the rapidity and efficiency with which the food product can be cooked, the minimization of energy and/or fuel utilized in cooking, the ease with which the system can be serviced and cleaned, the quality (and therefore desirability) of the cooked food products, and so forth.

The present invention improves on prior art broiler systems by providing a system which includes a combination of electric heating elements, a compressed air system which distributes and directs low pressure air through a plenum disposed above the cooking food product into an electric heating element portion of the broiler, an array of novel gas burners, and heat reflecting surfaces (i.e., radiant heat/infrared heating elements) on both the underside of the air plenum and on wings extending outwardly from the gas burner elements, all of which create a combination convention/radiant heat broiling system. The system provides rapidly cooked food products of uniform doneness, high quality, and moisture content.

Several rapid cooking broiler systems have been developed for use in the fast food industry, including those described in the following U.S. patents.

U.S. Pat. No. 4,936,286, to Baker, discloses a broiler system having at least two side-by-side broiling conveyors, and broiler units mounted adjacent to the conveyors extending across the combined widths of the two conveyors. To permit different heating conditions on the two conveyors while still permitting the broiler units to be interchangeable and made of interchangeable parts, a broiler unit is provided with a shield which blocks off the heated face of the broiler unit where the broiler unit faces one of the conveyors. The shield preferably carries a portion which extends towards the adjacent edges of two conveyors to prevent lateral heat radiation between the conveyors.

U.S. Pat. No. 4,188,868, to Baker et al, shows a broiler system having a food passageway restricted by baffles, including an entrance shield of heat-reflecting material formed as a fitting over the entrance burner housing and including a baffle sheet extending from the entrance burner housing through most of the gap toward the entrance opening, and an exit shield of similar heat-reflecting material formed as a fitting over the exit burner housing and having a baffle sheet extending from the exit burner housing through most of the gap toward the exit opening. In addition, there is an intermediate shield including a horizontal sheet of similar material resting on adjacent burner housings and having a vertical sheet depending from said horizontal sheet. The entrance shield, the exit shield and the intermediate shield define the upper limits of the passageway through the burner and tend to reflect heat away from the entrance and exit openings and to limit air circulation within and through the passageway.

U.S. Pat. No. 4,121,509, to Baker et al., teaches a housing having a passageway through which a continuous food conveyor operates, taking food products from an inlet end to an outlet end. Within the passageway the food products are exposed to infrared radiation from heaters, hot air blown from a fan through a supply duct and through groups of nozzles onto the patties, and steam or hot water vapor provided through the air supply. By using three different types of heat supply—direct infrared radiation, warm air, and water vapor—the system provides a quickly cooked food product having a relatively high moisture content.

U.S. Pat. No. 3,987,718 to Lang-Ree et al., discloses a hamburger patty and bun cooker having a frame supporting lower and upper heated platens. A product conveyor, typical of such systems, moves food product from the inlet to the outlet. At least one of the platens is provided with a low-friction layer between it and an advancing patty. The layer is constituted by jets of hot air discharged over the platen surface or by a Teflon-coated thin, metal foil sheet or by a Teflon-carrying thin, fiber glass sheet, the sheets being readily changeable. Bun portions for the individual patties are advanced on the same frame in paths parallel to the hamburger patties by comparable endless conveyors and are heated by individual platens on the frame as the bun portions advance.

The foregoing patents reflect the current state of the art of which the present inventors are aware. Reference to, and discussion of, these patents is intended to aid in discharging Applicants' acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

The present invention is an improved convection and radiant heating oven and broiler system which combines several novel elements. Most notable among those novel elements is the provision and use of a heated compressed air system employed during the first stage of cooking. The compressed air is delivered through a plenum disposed over the food product conveyor in the electric resistance heating element portion of the broiler, and low pressure compressed air passing through a plurality of holes in the underside of plenum is directed downwardly toward the food product so as to break up the water vapor envelope that typically covers and insulates the food product as it initially thaws and begins heating. This facilitates cooking and enhances browning.

The inventive system additionally includes a novel gas burner element with a novel wing design that directs and distributes gas flames so as to spread the heat provided by the elements and to include radiant heating surface on the underside of the wings.

It is therefore an object of the present invention to provide a new and improved oven and broiler system that cooks frozen foods rapidly using both convective and radiant heat.

It is another object of the present invention to provide a new and improved oven and broiler system that utilizes an air source to break the protective blanket of cold air surrounding frozen food products so as to expose the food surfaces to cooking heat early in the cooking process.

A further object or feature of the present invention is a new and improved oven and broiler system that improves uniform and aesthetically pleasing browning of rapidly cooked foods.

An even further object of the present invention is to provide a novel oven and broiler system that shapes flames provided by gas burners by using compressed air injected across the flame region.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Accordingly, before explaining the preferred embodiment of the disclosure in detail, it is to be understood that the disclosure is not limited in its application to the details of the construction and the arrangements set forth in the following description or illustrated in the drawings. The inventive apparatus described herein is capable of other embodiments and of being practiced and carried out in various ways.

Also, it is to be understood that the terminology and phraseology employed herein are for descriptive purposes only, and not limitation. Where specific dimensional and material specifications have been included or omitted from the specification or the claims, or both, it is to be understood that the same are not to be incorporated into the appended claims.

As such, those skilled in the art will appreciate that the inventive concept set out in this disclosure may readily be used as a basis for designing other structures, methods, and systems for carrying out the several purposes of the present invention. It is important, therefore, that the inventive concept be regarded as including such equivalent constructions in so far as they do not depart from the spirit and scope of the present invention. For a better understanding of the present invention, its advantages and the specific objects attained by its uses, reference should be made to the accompanying drawings and descriptive matter in which there is described and illustrated the preferred embodiment.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

The invention will be better understood and the objects of the invention will become apparent when consideration is given to the following detailed description thereof. Such description makes reference to the annexed drawings wherein:

FIG. 4 is a perspective view of the novel gas burner and radiant cap for the gas burners as employed in the present inventive broiler system;

FIG. 5 is a top plan view of the gas burner of FIG. 4;

FIG. 6 is side view in elevation of the gas burner of FIGS. 4 and 5; and

FIG. 7 is an end view in elevation of the gas burner and radiant cap.

DETAILED DESCRIPTION OF THE INVENTION

Figure 1:
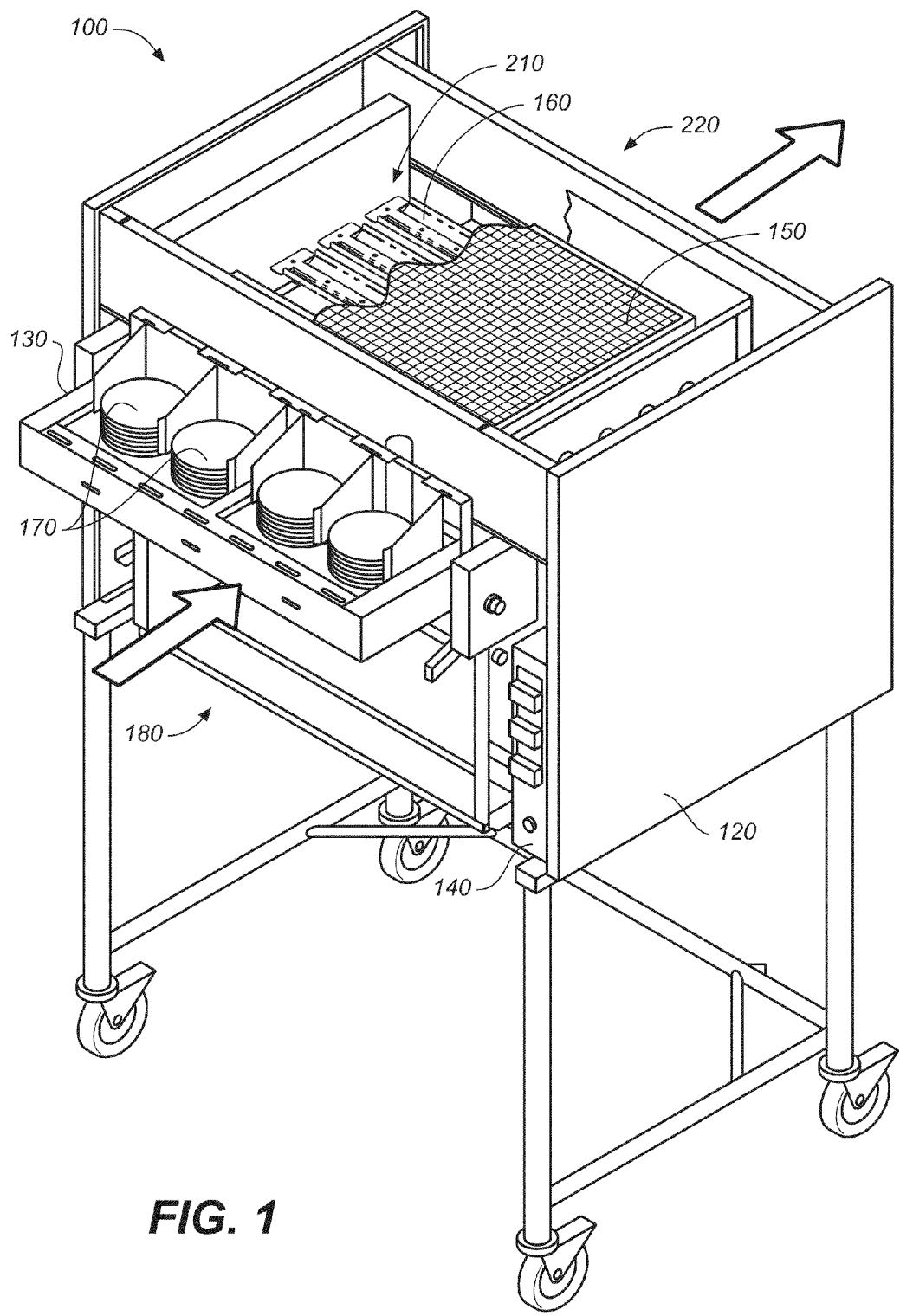
FIG. 1 is a perspective view of the inventive heated compressed air broiler system, showing the system with the top cover removed and the upper catalytic converter partly cut away to reveal the upper gas burner array.

Referring to FIGS. 1 through 6, wherein like reference numerals refer to like components in the various views, there is illustrated therein a new and improved multi-product broiler system, generally denominated 100 herein.

Figure 2:
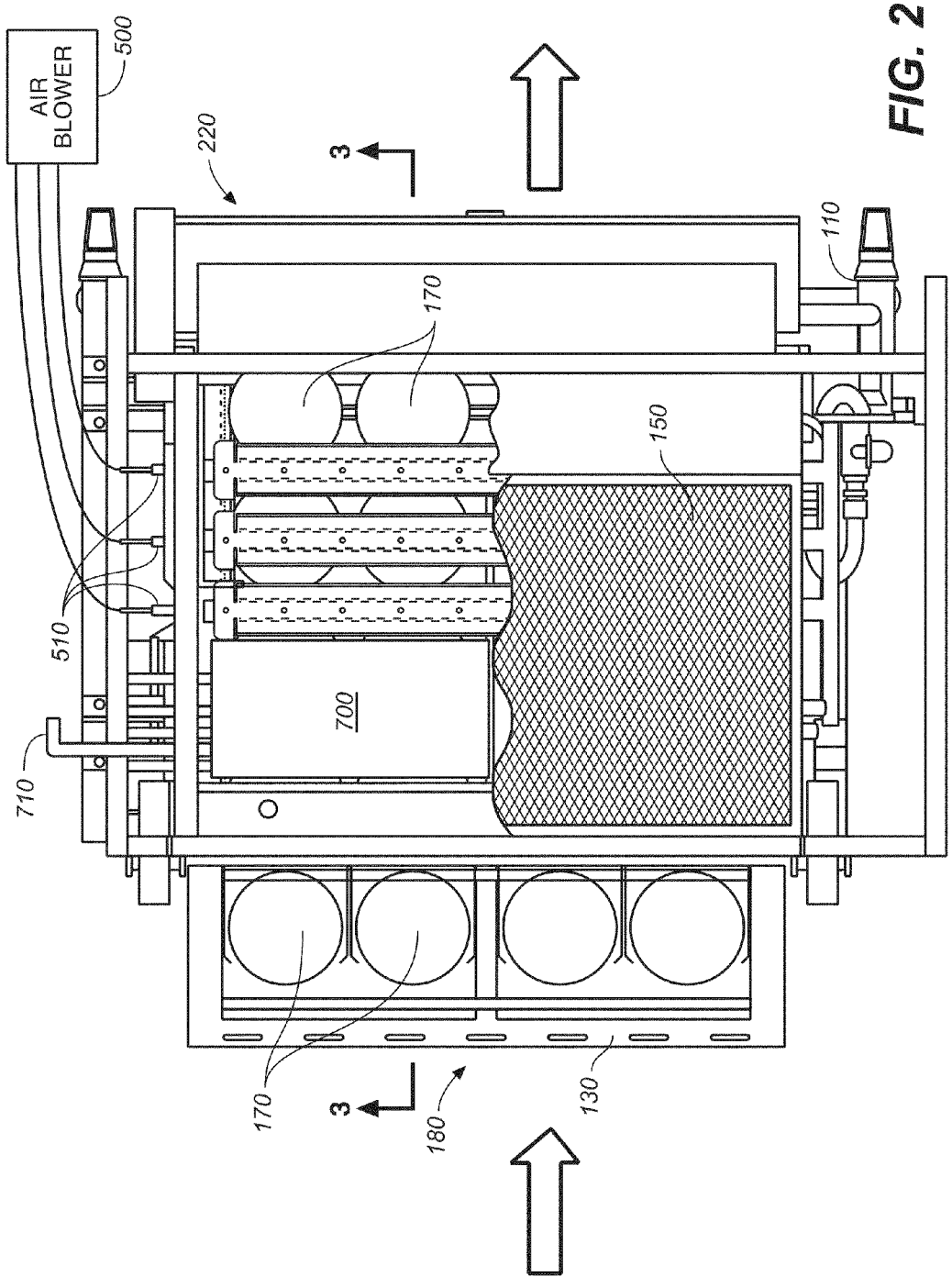
FIG. 2 is a partial cross-sectional top plan view showing the burner array, upper catalytic unit, and air supply plenum.
Figure 3:
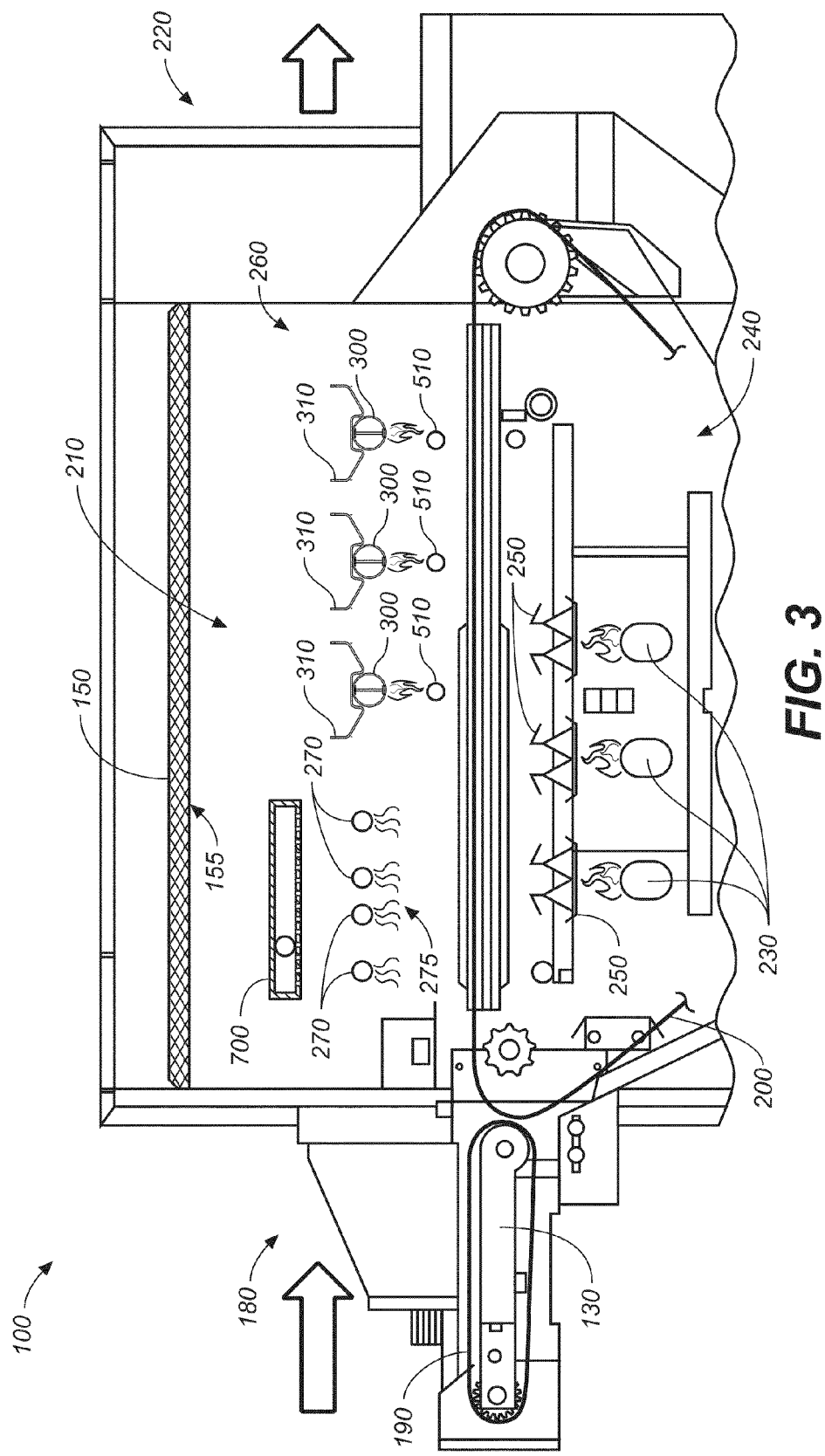
FIG. 3 is a cross-sectional side view in elevation of the upper portion of the broiler housing and heating system taken along the Section lines 3-3 shown in FIG. 2.

FIGS. 1-3 illustrate the general structural and operative elements of a first preferred embodiment of the heated compressed air oven of the present invention 100, showing that the inventive apparatus includes: a support frame and carriage 110; a housing 120 (preferrably stainless steel); an automatic food product feeder 130; a cooking control panel 140 presenting a consolidated plurality of control dials, button, switches, and the like; an upper catalytic converter 150; and an upper gas burner array 160.

Food products, such as hamburger patties 170, are conveyed into the inlet end 180 of the oven and broiler system housing the automatic product feeder, and via an inlet product conveyor 190, the food product is passed on to a product conveyor belt or grid 200, which moves the food product through the cooking chamber 210 and to the outlet end 220 of the housing.

In the most general terms, the cooking chamber includes a constellation of electric resistance heating elements, gas burners, each in spaced-apart arrays and disposed both above and below the product belt, as well as a plurality of reflective surfaces, all of which combine to provide both radiant and convective heat tailored to produce a continuous output of highly desirable food products in minimal time. More specifically, the cooking chamber includes a plurality of lower gas burners 230 disposed in the lower portion 240 of the cooking chamber to provide convective heat to the chamber.

Optionally, at least one electric heating element can be positioned in the lower portion of the cooking chamber to introduce a measure of radiant heat in the initial cooking stages. Disposed immediately above the lower burners are drip shields 250, which protect the lower burner flames and prevent flare ups.

The first stage of broiling in the upper portion 260 of the heating chamber is provided by a plurality of radiant electric elements 270 disposed transversely above the product conveyor belt. These elements preheat the food product or initiate a quick thaw if frozen product is used. As will be immediately appreciated, this effect is complemented by the heat provided by the lower heating elements and burners. The heat output 275 of the electric heating elements can be varied by using an automated percentage timer to vary wattage, as is well known in the art.

The second stage of upper broiling and cooking is provided by a plurality of gas burners 300, each provided with a novel radiant reflector cap 310 and having an array of orifices or ports (not shown) disposed on each side of the gas burner body between the radiant reflector cap and the bottom side 330 of the burner body. The radiant reflector cap is attached to the cylindrical burner body with a plurality of spot welds 320 and deflects flame from away from the burner and further reduces burner temperature while simultaneously creating a surface that contributes to radiant heat to accelerate cooking. Preferably, while the upper burners may be on a common gas supply with the lower burners, they are on a discrete control circuit so that they can be adjusted for output independently from the lower burners.

Optionally, a low pressure air source (roughly 5 psi) 500 can be provided to inject air into some or all of the heat cones produced by the gas burners to shape and control the flame field characteristics and cooking effects. Optimally, the air source is either an air pump or small compressor, rather than a fan, and is injected through a plurality of air injector nozzles 510 having tips tailored to create the desired flame and heat cone characteristics.

Disposed at the top of the cooking chamber is a catalytic converter 150, which may optionally be placed under negative air pressure, and which removes grease and smoke. However, the unit is also provided with a reflective lower surface 155 which is a primary producer of radiant heat in the cooking chamber. Accordingly, in addition to cleaning and conditioning vented gases, the catalytic converter improves the heat profile, saves energy, and reduces cooking time.

Next, a box-shaped air plenum 700 is provided and disposed above resistance elements 270. The plenum is in fluid communication with an air source through an air inlet 710. The plenum includes a plurality of small air outlet orifices so as to provide a gentle moving bank of air over the food product in the initial "quick thaw" stage of cooking. The moving air breaks the blanket of protective cold air that typically rests on frozen food product as it first enters a cooking apparatus, thereby exposing the surfaces of the food product to effective heating temperatures at an early stage of cooking in the cooking chamber. The plenum is height adjustable so that the volume and velocity of air directed onto the food product may be tailored to the particular food product cooking requirements.

The above-described upper burner system also allows the burners to be positioned at an optimum height above the food product, so that a single height setting can be employed for a variety of products. This eliminates the need for multiple broiling systems or machine having multiple chambers with differing heating element heights. By eliminating the need to adjust burner heights, the changeover to cooking food products having widely different broiling requirements is streamlined and simplified. Most of the cooking differences can be addressed with easy adjustments to either or both upper and lower burner sets.

FIGS. 4 through 6 show details of the gas burner 300 and radiant reflector cap 310 employed in the inventive oven system. These views show that the burner has a generally cylindrical elongate tube body 340 having a gas inlet portion 350 for insertion of a gas jet nozzle 360, and a burner portion 370 disposed below the radiant reflector cap 310. The radiant reflector cap is affixed to the burner body with a plurality of spot welds 320 disposed below the radiant reflector cap. The burner portion further includes a vertically disposed I-beam support element 380 running substantially the entire length of the burner portion of the tube body. This provides increased structural integrity which resists deformation under high heat.

The radiant reflector cap 310 comprises a medial channel portion 390 which is disposed over the top portion 400 of the tube body. Angling upwardly from the lower edges of the channel portion are generally symmetrical wing portions 410, 420, which curve into substantially vertical walls 430, 440, at the level of top of the tube body. The tube body portion includes a burner orifice array disposed below the radian reflector cap. The burner outlet array and radiant reflector cap configuration confines and controls the shape of the heat cone to minimize indirect heating of the burner and maximize the production of radiant heat.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. An oven and broiler for cooking foods using convection and radiant heat, comprising:
   a housing defining a cooking chamber and having an inlet for feeding uncooked food product into said cooking chamber, an outlet for discharging cooked food product from said cooking chamber, and conveying means for conveying food product from said inlet to said outlet;
   an array of heating elements disposed between said inlet and said outlet; and
   air injection means for providing a bank of moving air over the food product during the early stages of cooking in said cooking chamber, such that the blanket of cold air over the food product is broken and the surfaces of the food product are exposed to cooking heat early in the cooking process;
   wherein said array of heating elements includes one or more gas burners disposed above said conveying means, each of said one or more gas burners including an elongate tube body having a top portion, a bottom, and a gas inlet portion for insertion of a gas jet nozzle, a burner portion having at least one burner orifice array, a support element running substantially the entire length of said burner portion of said tube body and a radiant reflector cap having a medial channel disposed over said top portion of said tube body and above said burner orifice array, and symmetrical wings angling upwardly from said channel portion which curve into substantially vertical walls at approximately the level of the top of said tube body, said wings having an underside with a radiant heating surface.

2. The oven and broiler of claim 1, wherein said tube body has a burner orifice array disposed below said radiant reflector cap, such that said burner outlet array and said radiant reflector cap configuration confine and control the shape of the heat cone from said gas burners to minimize indirect heating of the burner and maximize the production of radiant heat.

* * * * *